United States Patent
Kashyap et al.

(10) Patent No.: US 11,150,825 B2
(45) Date of Patent: Oct. 19, 2021

(54) ADAPTIVE SPARE BLOCK USAGE IN SOLID STATE DRIVES

(71) Applicant: Microsoft Technology Licensing, LLC, Redmond, WA (US)

(72) Inventors: Abhilash Ravi Kashyap, San Jose, CA (US); Monish Shantilal Shah, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 16/704,575

(22) Filed: Dec. 5, 2019

(65) Prior Publication Data

US 2021/0173558 A1 Jun. 10, 2021

(51) Int. Cl.
*G06F 3/06* (2006.01)
*G06F 9/455* (2018.01)
*G06N 20/00* (2019.01)

(52) U.S. Cl.
CPC ............ *G06F 3/064* (2013.01); *G06F 3/0604* (2013.01); *G06F 3/0652* (2013.01); *G06F 3/0659* (2013.01); *G06F 3/0664* (2013.01); *G06F 3/0679* (2013.01); *G06F 9/45558* (2013.01); *G06N 20/00* (2019.01); *G06F 2009/45583* (2013.01)

(58) Field of Classification Search
CPC .............................. G06F 3/0604; G06F 3/0679
See application file for complete search history.

(56) References Cited

U.S. PATENT DOCUMENTS

| | | | | |
|---|---|---|---|---|
| 2009/0138654 | A1* | 5/2009 | Sutardja ............... | G11C 16/349 711/103 |
| 2011/0197045 | A1* | 8/2011 | Okamoto ............ | G06F 11/3034 711/166 |
| 2011/0264843 | A1 | 10/2011 | Haines et al. | |
| 2011/0271043 | A1* | 11/2011 | Segal .................. | G06F 12/0246 711/103 |
| 2015/0324264 | A1* | 11/2015 | Chinnakkonda Vidyapoornachary ...................... | G06F 11/108 714/6.11 |
| 2017/0131947 | A1* | 5/2017 | Hoang .................... | G06F 11/00 |
| 2018/0276116 | A1 | 9/2018 | Hahn et al. | |

(Continued)

OTHER PUBLICATIONS

"International Search Report and Written Opinion Issued in PCT Application No. PCT/US20/058989", dated Feb. 18, 2021, 14 Pages.

(Continued)

*Primary Examiner* — Edward J Dudek, Jr.

(57) ABSTRACT

In non-limiting examples of the present disclosure, systems, methods and devices for partitioning dies based on spare blocks and workload expectations are provided. Data from non-volatile storage media may be received. The data may comprise information identifying each of a plurality of dies included in the non-volatile storage media and a number of blocks included in each of the plurality of dies. A number of spare blocks included in each of the plurality of dies may be determined. First and second sets of the plurality of dies may be identified, wherein the first set has a higher number of spare blocks than the second set. A first workload may be assigned to the first set of dies, the first workload being classified as write-intensive. A second workload may be assigned to the second set of dies, the second workload being classified as read-intensive.

20 Claims, 7 Drawing Sheets

(56) References Cited

U.S. PATENT DOCUMENTS

2018/0357160 A1 12/2018 Gorobets et al.
2019/0004724 A1 1/2019 Kanno

OTHER PUBLICATIONS

Shen, et al., "DIDACache: An Integration of Device and Application for Flash-Based key-Value Caching", In ACM Transactions on Storage, vol. 14, No. 3, Article 26, Oct. 31, 2018, 32 Pages.

* cited by examiner

ADAPTIVE SPARE BLOCK USAGE IN SOLID STATE DRIVES

BACKGROUND

Solid state drives (SSD) built from NAND flash memory contain multiple NAND packages, which contain multiple NAND flash dies. NAND flash dies contain multiple blocks which are used to hold data and can be erased, programmed and read. NAND flash dies are designed to have a fixed number of total blocks. Though the total number of blocks on a die is fixed, the actual number of available good blocks on dies varies from one die to the next when they are implemented in SSDs. This is due to bad blocks which are marked out during the product development process. This process may leave uneven numbers of total good blocks in the dies used in the SSD.

The flash translation layer (FTL) in the SSD controller is used to manage all of the blocks available to it from the raw NAND flash side. Generally, a NAND flash die will have more blocks than what would be needed to meet the capacity requirements of an SSD. These extra blocks are called the spare blocks. The spare blocks are used to replace a good block within the set of capacity blocks when they fail. The blocks can fail due to program, erase or read failures. This may lead to the FTL marking these blocks as bad blocks and replacing them with the blocks that are available from the spare block list.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for partitioning storage dies in non-volatile storage media based on spare blocks and workload expectations. A number of dies included in a data storage device may be determined. An additional determination may be made as to a number of spare blocks included in each of those dies. The number of spare blocks may be a number of blocks in each die that is above a necessary number to meet capacity requirements for the storage device.

The data storage device may provide storage for a plurality of workloads that are executed in a host processing system associated with the data storage device. Each workload may correspond to a virtual machine and/or an application. The workloads may be classified as write-intensive or read-intensive. In some examples, the classification may be relative to each workload that the data storage device provides storage for. For example, a first workload may be expected to require a higher number of writes than a second workload. In another example, a first workload may be expected to require a higher ratio of writes to reads than a second workload.

The dies of the data storage device may be partitioned into two or more sets and one or more endurance groups. The sets may be partitioned based on a number of spare blocks that each die has. That is, sets may be partitioned based on having a relatively higher number of spare blocks per die and a relatively lower number of spare blocks per die. The workloads that are determined to have a higher write intensity may be assigned to those sets that have a relatively higher number of spare blocks per die, and the workloads that are determined to have a lower write intensity may be assigned to those sets that have a relatively lower number of spare blocks per die.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for partitioning storage dies in non-volatile storage media based on spare blocks and workload expectations. In examples, the non-volatile storage media may comprise an SSD. The SSD may comprise a NAND storage device. In some examples, the non-volatile storage media may have a capacity requirement (e.g., ½ TB, 1 TB). Each die of the non-volatile storage media may have a base number of blocks that is needed to meet the capacity requirement of the non-volatile storage media, and each block above that base number may be classified as a spare block.

According to examples, the dies in the non-volatile storage media may be partitioned into two or more sets. As used herein "set", "set of dies" or "die set" refers to one or more dies in storage media. A set of dies may be assigned to a specific workload (e.g., a virtual machine, an application executed on a virtual machine). One or more sets may be associated with a wear leveling policy and/or a garbage collection policy. As used herein "garbage collection" refers to a background process that allows a storage device to mitigate the performance impact of the program/erase cycle by performing certain tasks in the background. Specifically, garbage collection is the process of freeing up "old" partially or completely filled blocks by writing the valid data from those blocks to "new" free blocks and erasing the old blocks. Thus, the stale data from an old block is no longer included in the new blocks after garbage collection. Garbage collection may be performed at various thresholds (e.g., when a threshold number of blocks are full or almost full, when a threshold number of pages of a block are full, when a threshold number of pages are full for a threshold number or percentage of blocks, when there is a threshold percentage of free spare blocks remaining, when there is a threshold number of free spare blocks remaining). Garbage collection may be performed based on an amount of data validity in a given region (e.g., set, endurance group) that falls under a corresponding management policy. For example, a ratio of total invalid logical block addresses (LBAs) to total available LBAs. Garbage collection policies may vary across different sets and endurance groups as more fully described below. As an example, a write-intensive die set may have a first garbage collection policy applied to it, and a read-intensive die set may have a second, different, garbage collection policy applied to it.

The association of a wear leveling policy and/or garbage collection policy with one or more sets is referred to herein as an "endurance group". Each endurance group is a separate pool of storage for wear leveling and garbage collection purposes. Separate wear statistics may be reported for each endurance group. On drives with more than one endurance group, it may be possible to completely wear out one endurance group and cause it to go read-only while other endurance groups remain usable.

Workloads handled by a host associated with the non-volatile storage media may be individually assigned to die sets of the non-volatile storage media. In examples, a set of dies that has a higher number of spare blocks may be utilized to handle workloads with higher write intensity. Alternatively, a set of dies that has a lower number of spare blocks may be utilized to handle workloads with lower write intensity. That is, workloads that require a higher number of writes over a period of time may be assigned to die sets that have more blocks per die, and workloads that require a lower number of writes over a period of time may be assigned to die sets that have a lower number of blocks per die.

According to examples, the non-volatile storage media may be connected to a host processing system and communicate via the Non-Volatile Memory Host Controller Interface Specification (NVMHCIS) or the NVM Express (NVMe). In some examples, the die sets described herein may be partitioned into NVM sets and/or NVM endurance groups. Other specifications and communication interfaces may also be applied in implementing the systems, methods and devices described herein as more fully described below.

The systems, methods, and devices described herein provide technical advantages for storing data and extending the life of storage media. By assigning high write-intensity workloads to die sets with dies that include a relatively higher number of spare blocks, and assigning workloads with lower write-intensity to die sets with dies that include a relatively lower number of spare blocks, the drive as a whole is less likely to need to turn read-only due to the lack of space in a die with a relatively lower number of spare blocks being utilized by a write-intensive workload. Additionally, in allocating garbage collection policies based on actual block space and/or page space, the systems, methods and devices described herein are more efficient in that garbage collection may be initiated based on the specific sets that are included in corresponding endurance groups rather than applying a single policy to all dies in a storage device.

Figure 1:
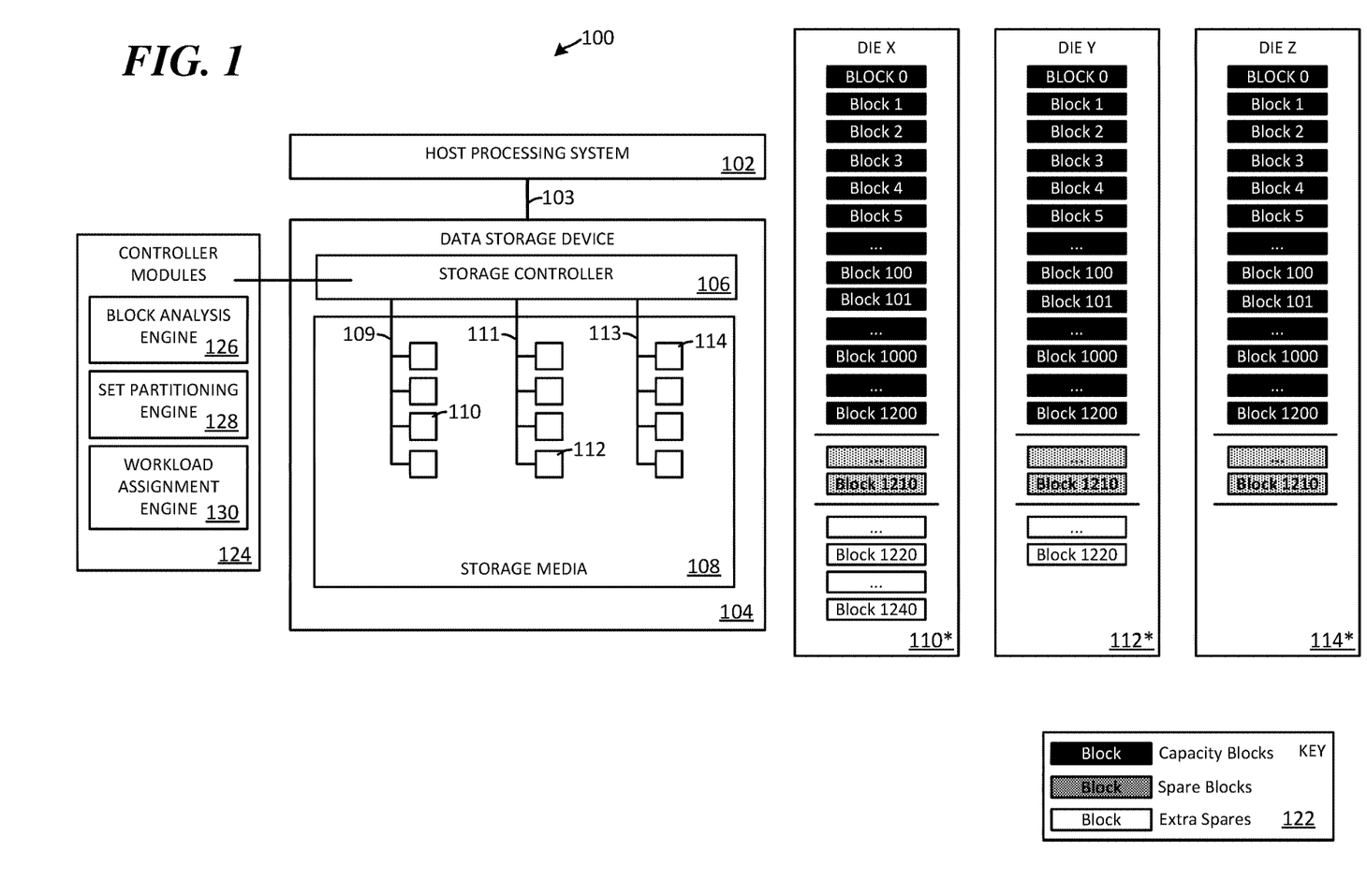
FIG. 1 illustrates an exemplary computing environment for partitioning storage dies based on spare blocks and workload specifications.

FIG. 1 illustrates an exemplary computing environment 100 for partitioning storage dies based on spare blocks and workload specifications. Computing environment 100 includes host processing system 102 and data storage device 104, wherein data storage device 104 further includes storage controller 106 operatively coupled with storage media 108. Host processing system 102 communicates with data storage device 104 via communication link 103, wherein communication link 103 may comprise a Peripheral Component Interconnect Express (PCIe) bus, a Small Computer System Interface (SCSI) bus, a Serial Attached SCSI (SAS) bus, a Serial Advanced Technology Attachment (SATA) bus, Fibre channel, or some other similar interface or bus.

Storage media 108 is representative of non-volatile storage media, such as solid-state storage media and flash media, that is used as a form of static memory whose data is saved when a computer is turned off or loses its external power source. Storage media 108 comprises a plurality of dies, planes, blocks, and pages. The dies are the smallest unit of storage media 108 that may independently execute commands or report status. The NAND flash dies within the NAND flash package are connected to storage controller 106 by channels. In the illustrated example there are three separate channels—channel 109, channel 111, and channel 113. It should be understood that aspects of the current disclosure may be applied to various SSD controllers based on the number of backend channels (e.g., four channels, eight channels, sixteen channels, or any combination thereof). Each of the illustrated channels includes four dies. For exemplary purposes, die 110 from channel 109 is illustrated in more detail as die X 110*, die 112 from channel 111 is illustrated in more detail as die Y 112*, and die 114 from channel 113 is illustrated in more detail as die Z 114*. Each die contains one or more planes. Identical, concurrent operations may take place on each plane. Each plane contains a number of blocks, which are the smallest unit that can be erased. Each block contains a number of pages, which are the smallest unit that can be written to. Each page contains a number of cells. These cells may be configured as single level cells (SLC), multi-level cells (MLC), triple-level cells (TLC), quad-level cells (QLC), and/or penta-level cells (PLC).

In maintaining storage for storage media 108, storage media 108 is coupled to storage controller 106. The controller may be implemented in hardware, firmware, software, or a combination thereof, and bridges the memory components of the device to a host. In a hardware implementation, the controller includes control circuitry coupled to a storage medium. The control circuitry includes a receive circuit that receives write requests from a host. Each write request includes data that is the subject of the write request, as well as a target address for the data. The target address may be a logical block address (LBA), physical block address (PBA), or other such identifier that describes where to store the data. Storage controller 106 further includes controller modules 124, which may be implemented in hardware, firmware, software, or a combination thereof. Controller modules 124 include block analysis engine 126, set partitioning engine 128, and workload assignment engine 130.

Storage controller 106 may comprise a processing system operatively coupled to a storage system. The processing system may comprise a microprocessor and other circuitry that retrieves and executes operating software from the storage system. The storage system may include volatile and nonvolatile, removable and non-removable media implemented in any method or technology for storage of information, such as computer readable instructions, data structures, program modules, or other data. The storage system may be implemented as a single storage device but may also be implemented across multiple storage devices or subsystems. The storage system may comprise additional elements, such as a controller to read operating software from the storage systems. Examples of storage media include random access memory, read only memory, magnetic disks, optical disks, and flash memory, as well as any combination or variation thereof, or any other type of storage media. It should be understood that in no case is the storage media a propagated signal.

The processing system is typically mounted on a circuit board that may also hold the storage system. The operating software of the storage system comprises computer programs, firmware, or some other form of machine-readable program instructions. The operating software of the storage system is capable of providing the erasure operations described herein for a storage controller. The operating software on the storage system may further include an operating system, utilities, drivers, network interfaces, applications, or some other type of software or firmware. When read and executed by the processing system the operating software on the storage system direct the controller to operate as described herein.

In the current example, each die may have 1200 blocks to meet the capacity requirements of data storage device 104, and the spare blocks are blocks in excess of those 1200 blocks. In this example, die Z 114\* has 1210 blocks, so it has 10 spare blocks. In this example, die Z 114\* has the least number of blocks of all of the dies included in storage media 108. Die X 110\* has 1240 blocks, so it has 10 spare blocks and 30 extra spare blocks (i.e., the number of blocks above the number of blocks in the die with the lowest number of spares). Die Y 112\* has 1220 blocks, so it has 10 spare blocks and 10 extra spare blocks. Although the blocks are identical, they are indicated as being capacity blocks, spare blocks, or extra spare blocks for ease of illustration. Their designation is indicated by key 122.

Storage media 108 may send data from each die to storage controller 106. The data may comprise information identifying each of the dies included in storage media 108, and a number of blocks included in each of those dies. The data may additionally comprise location data for each of the dies and corresponding blocks. In some examples, the data may be sent by storage controller 106 to host processing system 102 during the SSD initialization process. In examples, utilizing that information, block analysis engine 126 may determine a number of spare blocks (spares and extra spares) included in each die included in storage media 108.

Host processing system 102 may identify a workload type associated with virtual machines and/or applications executed by host processing system 102. For example, host processing system 102 may identify whether each virtual machine and/or application executed by host processing system 102 is read-intensive or write-intensive. The read and/or write intensity may be determined based on scale that is relative to each other virtual machine and/or application executed by host processing system 102. In other examples, the read and/or write intensity may be determined on a scored absolute basis. In some examples, host processing system 102 may simply receive data that specifies a workload type of a virtual machine and/or application. In other examples, host processing system 102 may analyze historical and/or real-time data associated with a virtual machine and/or application and determine the workload type based on that data. The workload type may be determined based on a number of reads and/or writes that are performed over a period of time. In other examples, the workload type may be determined based on a number of writes of a specific amount of data over a period of time. Other variables may be taken into account in making a workload type determination for a given virtual machine and/or application.

Utilizing the workload type information for each virtual machine and/or application executed on host processing system 102, as well as the spare block information determined by block analysis engine 126, set partitioning engine 128 may partition the dies of storage media 108 into sets and subsets. In examples, the partitioning may be based on software and/or firmware (e.g., not a physical partitioning). In additional examples, the partitioning may be at least partially hardware based (e.g., by channel, by row) In examples, dies may be partitioned into sets based on the number of blocks that they have. For example, dies with a relatively higher number of blocks, and therefore spares, may be partitioned into one or more sets that will be utilized by write-intensive virtual machines and/or applications. Alternatively, dies with a relatively lower number of blocks may be partitioned into one or more sets that will be utilized by read-intensive virtual machines and/or applications. In some examples, those sets may be associated with endurance-based policies. For example, one set of dies may have a first garbage collection policy applied to it (e.g., perform garbage collection when there are X free blocks remaining in the set, perform garbage collection when there are Y invalid pages in a set) and another set of dies may have a second garbage collection policy applied to it (e.g., perform garbage collection when there are X+10 free blocks remaining in the set, perform garbage collection when there are Y+50 invalid pages in a set). In some examples, the endurance-based policies may be implemented all or in part by a flash translation layer (FTL). In other examples, the endurance-based policies may be implemented all or in part by storage controller 106.

According to examples, set partitioning engine 128 may partition the dies not only based on a number of blocks, but also by physical location. In some examples, partitioning engine 128 may partition dies on a downstream channel basis. For example, set partitioning engine 128 may partition a first set of dies that includes each die in channel 109, a second set of dies that includes each die in channel 111, and a third set of dies that includes each die in channel 113. In some examples, a set may include more than one channel of dies (e.g., a set of dies comprising channel 109 and channel 111). In additional examples, partitioning engine 128 may partition dies on a cross-stream channel basis. For example, set partitioning engine 128 may partition a first set of dies that includes the first die in channel 109, the first die in channel 111 and the first die in channel 113, and partitioning engine 128 may partition a second set of dies that includes the second die in each of those channels and so on. In still other examples, set partitioning engine 128 may partition dies irrespective of their channel location. That is, set partitioning engine 128 may partition dies based only on a number of blocks, or a number of spare blocks, included in each die.

Workload assignment engine 130 may perform operations associated with set partitioning engine 128. Workload assignment engine 130 may utilize the workload types for virtual machines and/or applications as indicated by host processing system 102 and assign those workloads to the partitioned sets. For example, workload assignment engine 130 may assign virtual machines and/or applications with write-intensive workloads to sets that have a higher number of blocks per die, while assigning virtual machines and/or applications with read-intensive workloads (or alternatively stated, less intensive write workloads) to sets that have a lower number of blocks per die. Thus, in this specific example, die X 110* may be partitioned into a set of dies that have a relatively higher number of blocks, and that set may be utilized for handling write-intensive workloads; die Y 112* may be partitioned into a set of dies that have a relatively medium number of blocks, and that set may be utilized for handling medium workloads (e.g., neither write-intensive nor read-intensive); and die Z 114* may be partitioned into a set of dies that have a relatively low number of blocks, and that set may be utilized for handling read-intensive workloads.

Figure 2:
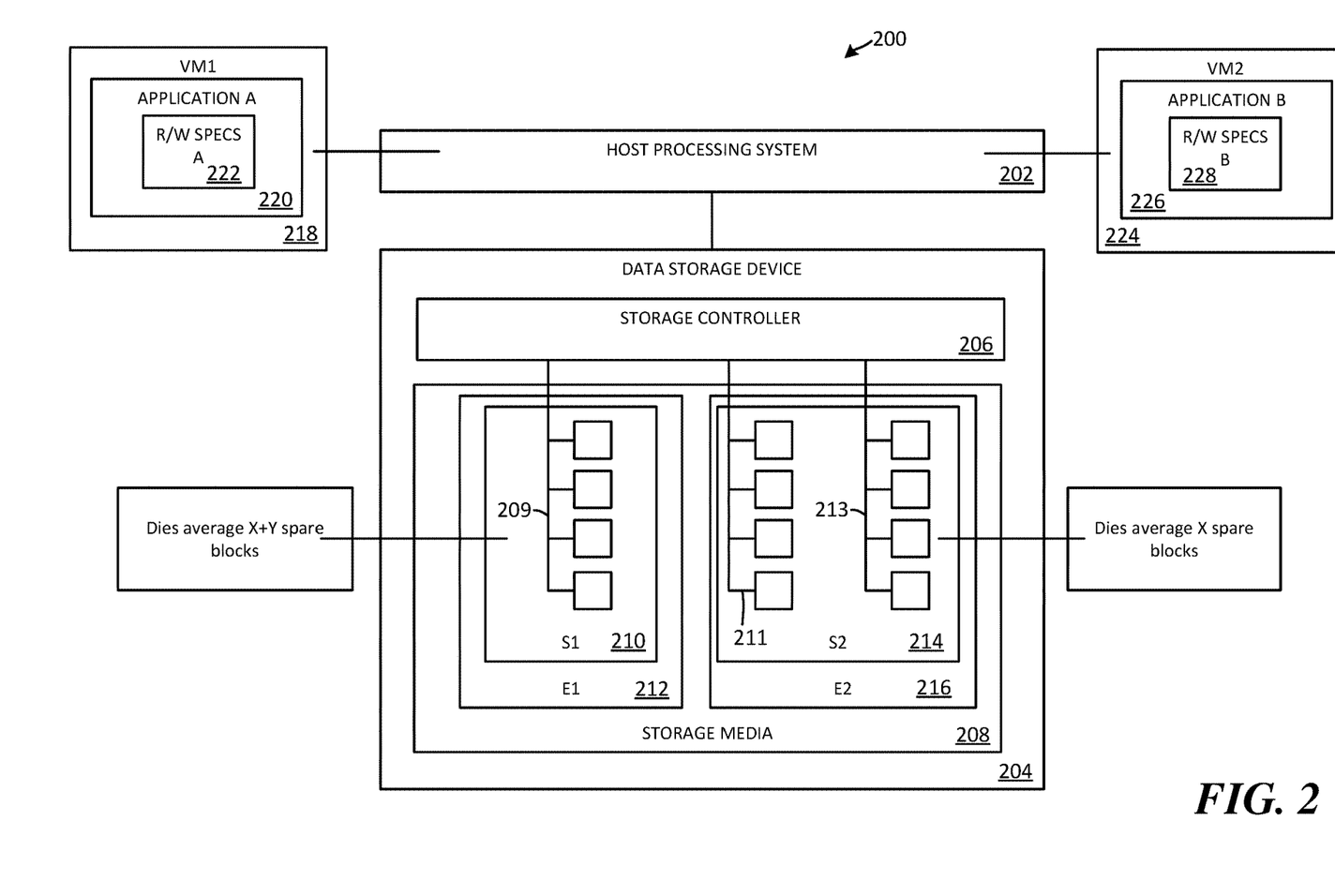
FIG. 2 illustrates an exemplary computing environment that includes solid state storage that has been partitioned into a first down-channel set and endurance group for use by a first virtual machine and a second down-channel set and endurance group for use by a second virtual machine.

FIG. 2 illustrates an exemplary computing environment 200 that includes solid state storage that has been partitioned into a first down-channel set and endurance group for use by a first virtual machine and a second down-channel set and endurance group for use by a second virtual machine. Computing environment 200 includes virtual machine 1 (VM1 218), virtual machine 2 (VM2 224), host processing system 202, and data storage device 204. Data storage device 204 includes storage controller 206 and storage media 208.

In this example, storage media 208 includes a plurality of dies that are connected to storage controller 206 via three separate channels. The dies have been partitioned for handling workloads based on a down-stream channel partitioning. Specifically, each die in channel 209 has been partitioned into first set 210 and first endurance group 212. Additionally, each die in second channel 211 and third channel 213 have been partitioned into second set 214 and second endurance group 216.

VM1 218 executes application A 220, which has read/write specifications A 222. Read/write specifications A 222 may include a number of reads and/or writes that are expected to be needed for execution of application A over a set duration of time. In additional examples, read/write specifications A 222 may include a number of reads and/or writes of more than a threshold amount of data that are expected to be needed for execution of application A over a set duration of time. In examples, read/write specifications A 222 may be provided directly to host processing system 202. In some examples, application A 220 may have been previously run on one or more other processing systems and utilized one or more other storage devices, and that historical data from executing application A 220 may be utilized to determine read/write specifications A 222 In some examples, one or more machine learning models that have been trained to identify read-write patterns may be applied to the historical data to determine read/write specifications A 222.

Similarly, VM2 224 executes application B 226, which has read/write specifications B 228. Read/write specifications B 228 may include a number of reads and/or writes that are expected to be needed for execution of application B over a set duration of time. In additional examples, read/write specifications B 228 may include a number of reads and/or writes of more than a threshold amount of data that are expected to be needed for execution of application B 226 over a set duration of time. In some examples, application B 226 may have been previously run on one or more other processing systems and utilized one or more other storage devices, and that historical data from executing application B 226 may be utilized to determine read/write specifications B 228. In some examples, one or more machine learning models that have been trained to identify read-write patterns may be applied to the historical data to determine read/write specifications B 228.

In this example, when VM1 218 and VM2 224 are allocated to host processing system 202 and data storage device 204, a determination may be made as to the storage requirements of each respective virtual machine. In this example, a determination is made that VM2 224 requires twice the storage bandwidth of VM1 218. Additionally, a determination is made that VM2 224 has a relatively less write-intensive workload specification/requirement than VM1 218. As such, the data associated with VM2 224 and application 226 is allocated to second set 214, which includes twice the number of dies as first set 210, but those dies have an average spare number of blocks that is less than the average spare number of blocks included in the dies of first set 210. In other examples, each die in first set 210 may have a higher number of spare blocks than the die in second set 214 with the lowest number of blocks.

In part because VM1 218 requires half the storage bandwidth of VM2 224 and in part because VM1 218 has a relatively higher write-intensive workload specification/requirement than VM2 224, the data associated with VM1 218 and application 220 is allocated to first set 212, which includes half the number of dies as second set 214, but those dies have an average spare number of blocks that is more than the average spare number of blocks included in the dies of second set 214. Thus, the dies included in set 1 210 are better able to accommodate VM1 218 because of the lesser likelihood that those dies will fail in relation to the higher write-intensive workload required by VM1 218.

In this example each of the dies included in set 1 210 have a first garbage collection policy applied to them as indicated by endurance group 212. Similarly, each of the dies included in set 2 214 have a second garbage collection policy applied to them as indicated by endurance group 216.

Figure 3:
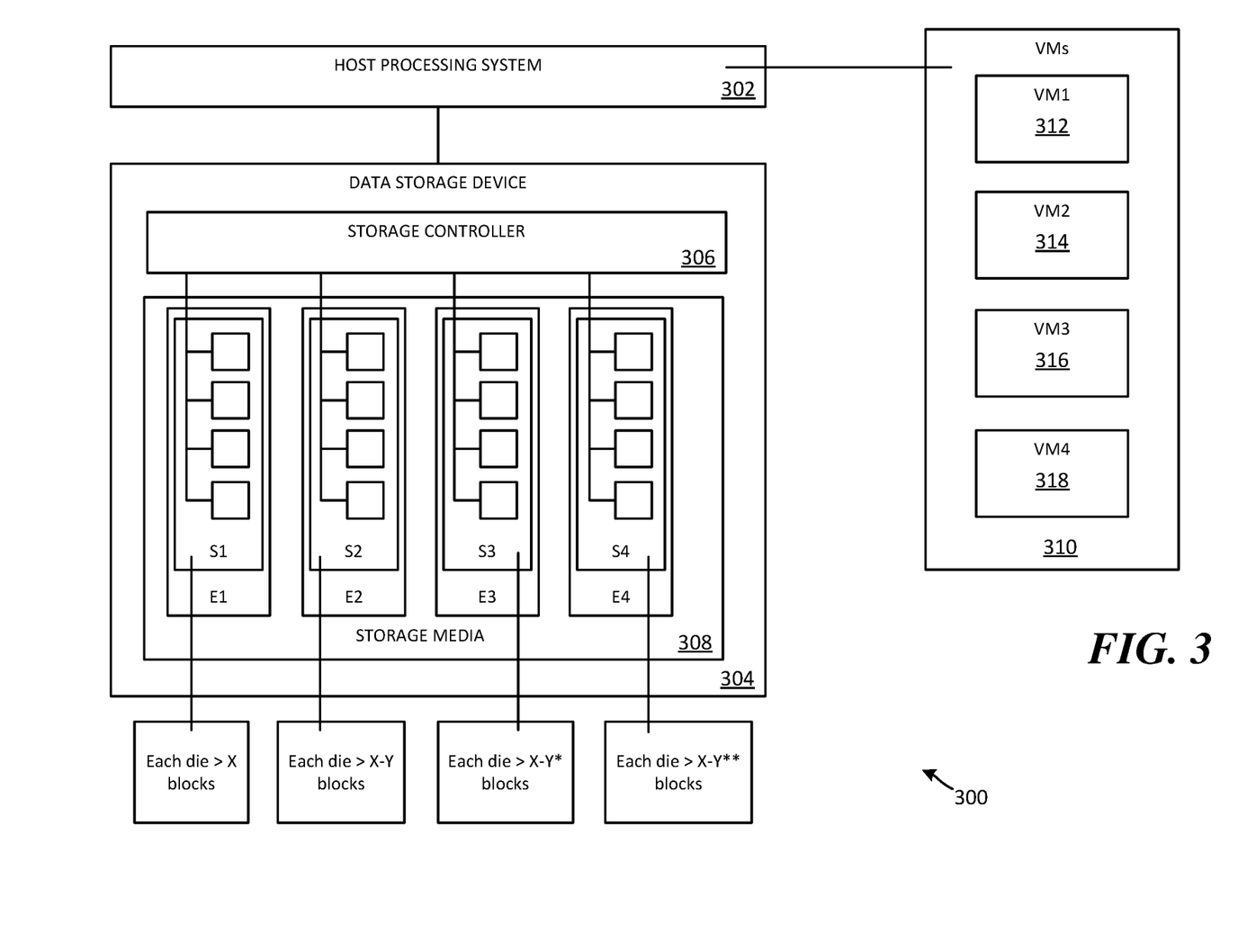
FIG. 3 illustrates an exemplary computing environment that includes solid state storage that has been partitioned into four down-channel sets and corresponding endurance groups for use by four virtual machines and their corresponding workloads.

FIG. 3 illustrates an exemplary computing environment 300 that includes solid state storage that has been partitioned into four down-channel sets and corresponding endurance groups for use by four virtual machines and their corresponding workloads. Computing environment 300 includes virtual machine 1 (VM1 312), virtual machine 2 (VM2 314), virtual machine 3 (VM3 316), and virtual machine 4 (VM4 318). Computing environment 300 also includes host processing system 202, which executes each of the virtual machines (VM1-VM4), and data storage device 304. Data storage device 304 includes storage controller 306 and storage media 308.

Read/write specifications for each of VM1 312, VM2 314, VM3 316, and VM4 318 may have already been determined. Those read/write specifications may include at least an indication of a number of write operations that are expected over a threshold period of time. In some examples, the read/write specifications may include an indication of an amount of data that is expected to be written per write operation over a threshold period of time. In additional examples, the read/write specifications may include a number of read operations that are expected to be executed over a threshold period of time. In still other examples, the read/write specifications may include a number of read operations over a certain amount of data that are expected to be executed over a threshold period of time.

In this example, VM1 312, VM2 314, VM3 316, and VM4 318 are allocated to host processing system 302 and data storage device 304. A determination may be made as to the storage requirements of each respective virtual machine. In this example, a determination is made that each virtual machine requires approximately the same amount of storage. Additionally, a determination is made that VM1 312, VM2, 314, VM3 316, and VM4 318 require approximately the same number of dies for storage purposes. An additional determination is made that VM1 312 has a higher write-intensity workload than VM2 314, which has a higher write-intensity workload that VM3 316, which has a higher write-intensity workload than VM4 318. As such, the data associated with VM1 312 is allocated to first set S1, data associated with VM2 314 is allocated to second set S2, data associated with VM3 316 is allocated to third set S3, and data associated with VM4 318 is allocated to fourth set S4. Each die in set S1 has greater than X blocks. Each die in set S2 has greater than X minus Y blocks. Each die in set S3 has greater than X minus Y* blocks, where Y* is greater than Y. Each die in set S4 has greater than X minus Y blocks, where Y is greater than Y*. In other examples, the average number of blocks in the dies of set S1 may be higher than the average number of blocks in the dies of set S2, which may be higher than the average number of blocks in the dies of set S3, which may be higher than the average number of blocks in the dies of set S4. Thus, the virtual machines with higher write-intensity workloads are assigned to die sets that have a higher number of blocks.

In this example, each set of dies (S1, S2, S3, S4) is also associated with a different garbage collection policy, as indicated by the different endurance groups. That is, set S1 has a first garbage collection policy, as indicated by endurance group 1 (E1), set S2 has a second garbage collection policy, as indicated by endurance group 2 (E2), set S3 has a third garbage collection policy, as indicated by endurance group 3 (E3), and set S4 has a fourth garbage collection policy, as indicated by endurance group 4 (E4). The garbage collection policies for the more write-intensive sets may provide for garbage collection at different thresholds than for less write-intensive sets.

As an example, the garbage collection policy for endurance group 1 (E1) may provide for garbage collection to be performed when there are X number of spare blocks remaining in the set, and the garbage collection policy for endurance group 4 (E4) may provide for garbage collection to be performed when there are X+Y or X-Y number of spare blocks remaining in the set. In additional examples, the garbage collection policy for endurance group 1 (E1) may provide for garbage collection to be performed when there are X number of full blocks (or almost full blocks) in the set, and the garbage collection policy for endurance group 4 (E4) may provide for garbage collection to be performed when there are X-Y or X+Y number of full blocks (or almost full blocks) in the set. In other examples, the garbage collection policy for endurance group 1 (E1) may provide for garbage collection to be performed when there is X % of spare blocks remaining in the set, and the garbage collection policy for endurance group 4 (E4) may provide for garbage collection to be performed when there is Y % of spare blocks remaining in the set.

Although in this example each set of dies is indicated as having its own garbage collection policy, it should be understood that a single garbage collection policy may be applied to each of the sets, a first garbage collection policy may be applied to two of the sets and a second garbage collection policy may be applied to the remaining two sets, or a first garbage collection policy may be applied to three of the sets and a second garbage collection policy may be applied to the remaining set.

Figure 4:
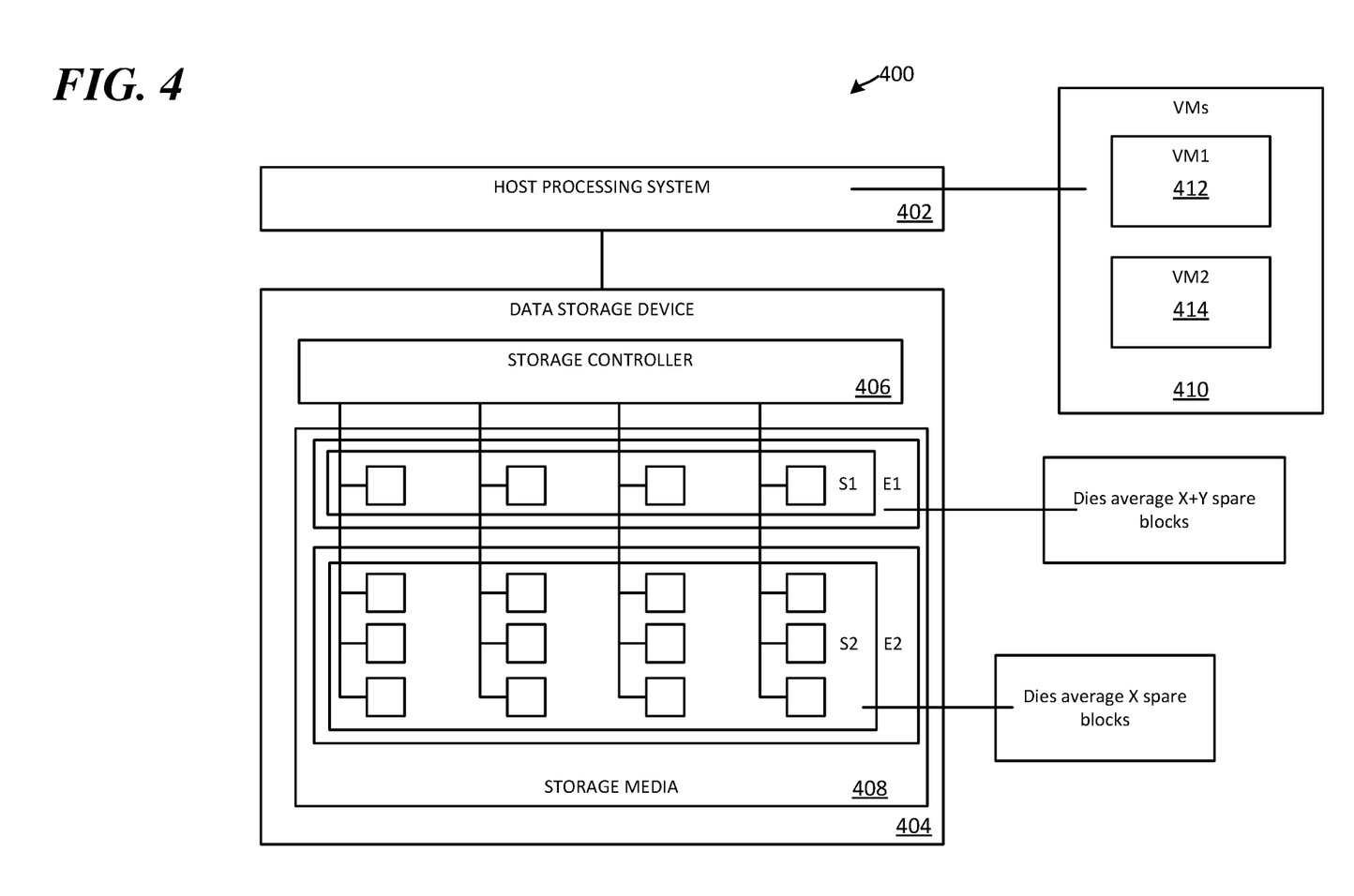
FIG. 4 illustrates an exemplary computing environment that includes solid state storage that has been partitioned into two cross-channel sets and corresponding endurance groups for use by two virtual machines and their corresponding workloads.

FIG. 4 illustrates an exemplary computing environment 400 that includes solid state storage that has been partitioned into two cross-channel sets and corresponding endurance groups for use by two virtual machines and their corresponding workloads. Computing environment 400 includes virtual machines 410, which includes virtual machine 1 (VM1 412) and virtual machine 2 (VM2 414). Computing environment 400 also includes host processing system 402, which executes virtual machines 410, and data storage device 404. Data storage device 404 includes storage controller 406 and storage media 408.

Read/write specifications for each of VM1 412 and VM2 414 may have been determined. Those read/write specifications may include at least an indication of a number of write operations that are expected over a threshold period of time. In some examples, the read/write specifications may include an indication of an amount of data that is expected to be written per write operation over a threshold period of time. In additional examples, the read/write specifications may include a number of read operations that are expected to be executed over a threshold period of time. In still other examples, the read/write specifications may include a number of read operations over a certain amount of data that are expected to be executed over a threshold period of time.

In this example, VM1 412 and VM2 414 are allocated to host processing system 402 and data storage device 404. A determination may be made as to the storage requirements of each respective virtual machine. In this example, a determination is made that VM1 412 requires approximately one-third the amount of storage as VM2 414. An additional determination may be made that although VM1 412 requires less storage than VM2 414, VM1 412 has a higher write-intensity workload than VM2 414. In this example, a first plurality of dies that average a higher number of spare blocks than a second plurality of dies may be selected for VM1 412. This first plurality of dies is allocated to VM1 412 as set S1, which has fewer dies than set S2 because VM1 412 has lower storage requirements. However, set S1 has a higher average number of spare blocks due to VM1 412 having a more write-intensive workload than VM2 414. As such, VM2 414 is assigned to set S2.

In this example, each set of dies (S1, S2) is also associated with a different garbage collection policy, as indicated by the different endurance groups. That is, set S1 has a first garbage collection policy, as indicated by endurance group 1 (E1), and set S2 has a second garbage collection policy, as indicated by endurance group 2 (E2). Each of the garbage collection policies may be associated with different thresholds for initiating garbage collection for the corresponding set of dies.

Figure 5:
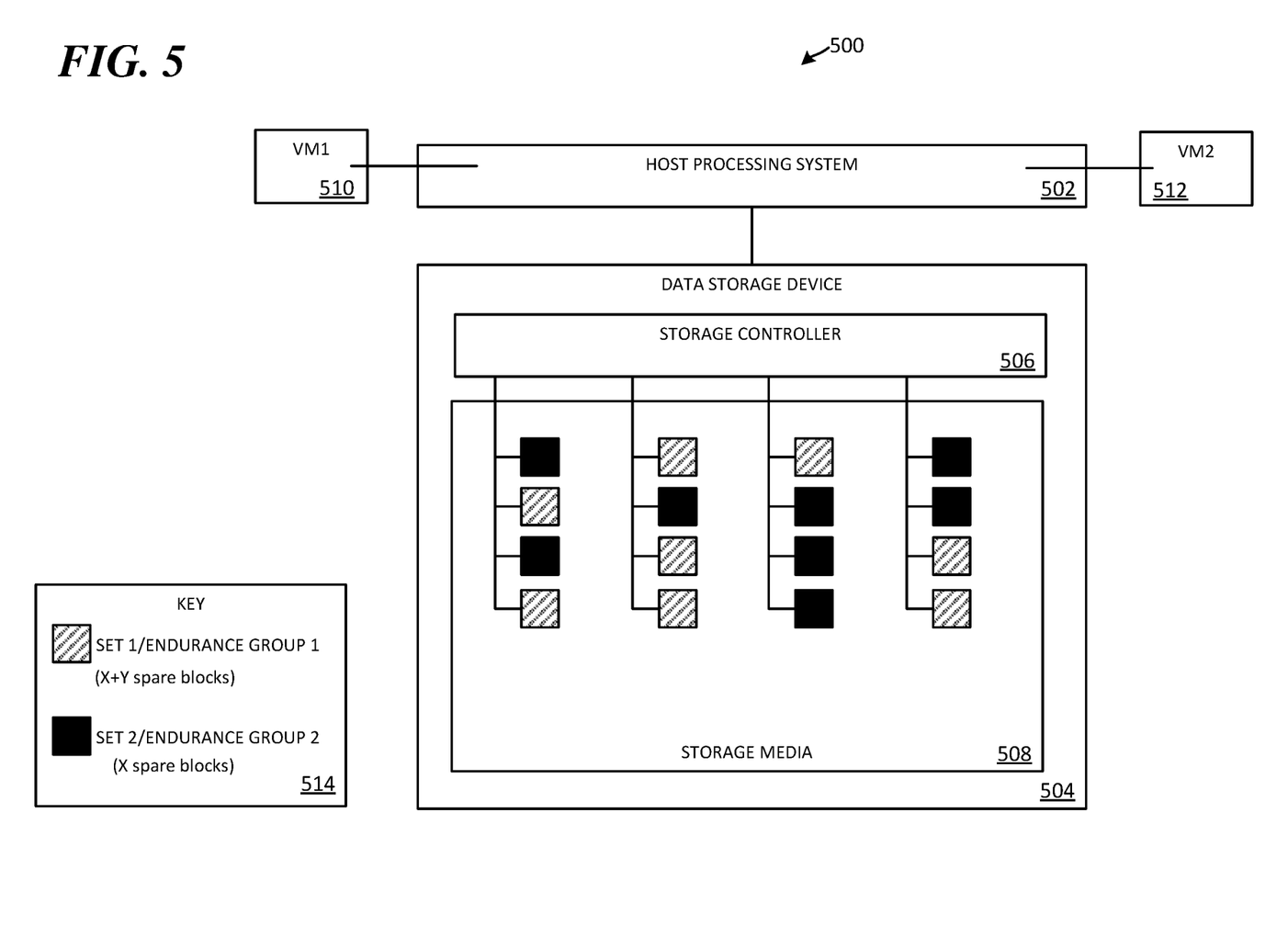
FIG. 5 illustrates an exemplary computing environment that includes solid state storage that has been partitioned into two channel-agnostic sets and corresponding endurance groups for use by two virtual machines and their corresponding workloads.

FIG. 5 illustrates an exemplary computing environment 500 that includes solid state storage that has been partitioned into two channel-agnostic sets and corresponding endurance groups for use by two virtual machines and their corresponding workloads. Computing environment 500 includes virtual machine 1 (VM1 510) and virtual machine 2 (VM2 512). Computing environment 500 also includes host processing system 502, which executes each of virtual machines VM1 510 and VM2 512, and data storage device 504. Data storage device 504 includes storage controller 506 and storage media 508. Key 514 indicates that a first set S1 (dies indicated with diagonal lines) has a higher number of spare blocks than a second set S2 (dies indicated as filled in).

Read/write specifications for each of VM1 510 and VM2 512 may have been determined. Those read/write specifications may include at least an indication of a number of write operations that are expected over threshold period of time. In some examples, the read/write specifications may include an indication of an amount of data that is expected to be written per write operation over a threshold period of time. In additional examples, the read/write specifications may include a number of read operations that are expected to be executed over a threshold period of time. In still other examples, the read/write specifications may include a number of read operations over a certain amount of data that are expected to be executed over a threshold period of time.

In this example, VM1 510 and VM2 512 are allocated to host processing system 502 and data storage device 504. A determination may be made as to the storage requirements of each respective virtual machine. In this example, a determination is made that each virtual machine requires approximately the same amount of storage. Additionally, a determination is made that VM1 510 and VM2 512 require approximately the same number of dies for storage. An additional determination is made that VM1 510 has a higher write-intensity workload than VM2 512. As such, the data associated with VM1 510 is allocated to first set S1 and data associated with VM2 512 is allocated to second set S2. In some examples, each die in set S1 may have a higher number of blocks that each die in set S2. In other examples, the average number of blocks in the dies included in set S1 may have a higher number of blocks than the average number of blocks in the dies included in set S2. In this example, the dies in set S1 and set S2 are distributed amongst various channels and rows of storage media 508. As such, the dies may be selected individually based on a number of blocks (or spare blocks) that are included in each of those dies, as opposed to allocating sets based on an average number of blocks in a given channel and/or row. Thus, selecting dies individually for allocation in specific sets provides a greater ability to custom tailor wear leveling to individual workloads.

In this example, set S1 and S2 are illustrated as being associated with a same garbage collection policy. However, it should be understood that a first garbage collection policy may be applied to set S1 and a different garbage collection policy may be applied to set S2.

Figure 6:
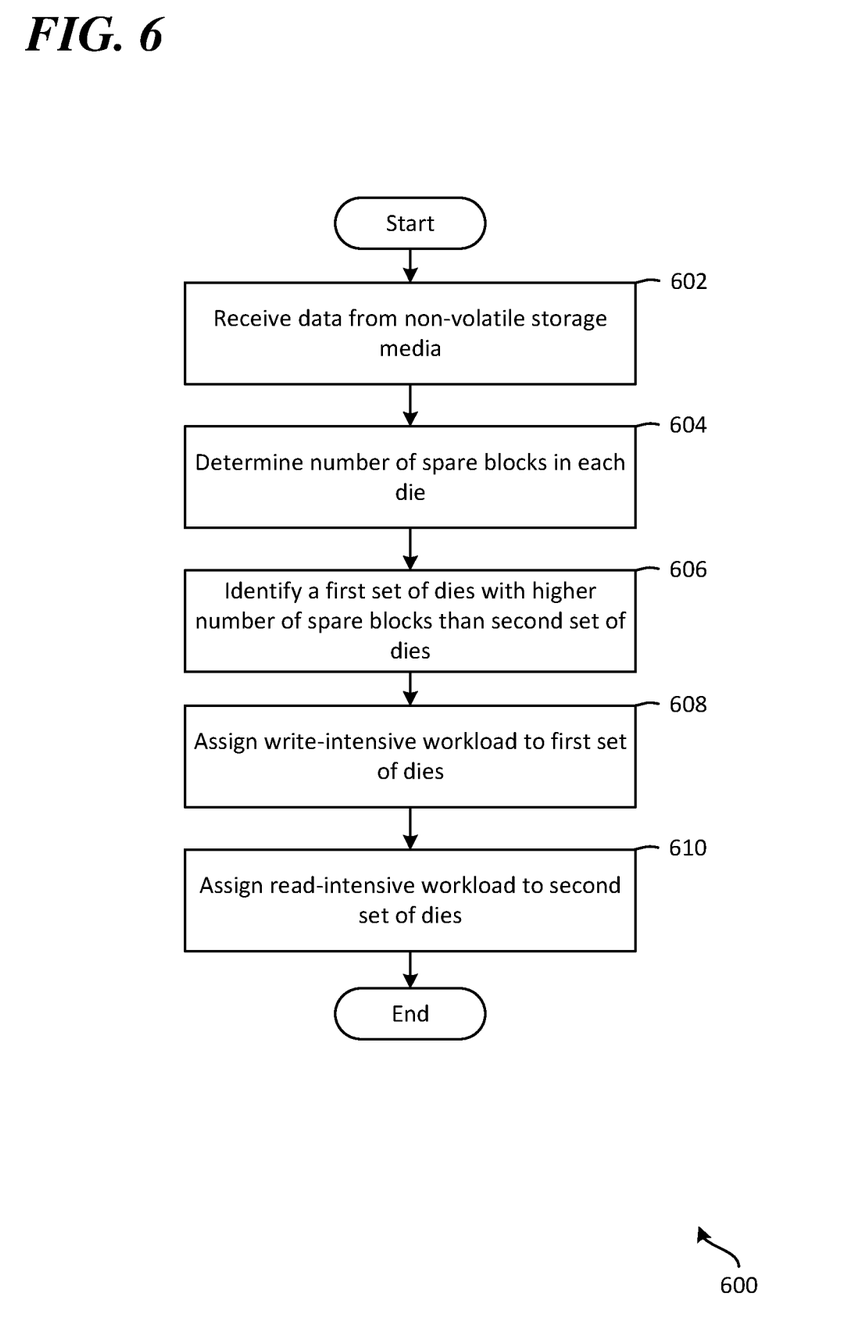
FIG. 6 is an exemplary method for distributing storage workloads across die sets and endurance groups in solid state storage.

FIG. 6 is an exemplary method 600 for distributing storage workloads across die sets and endurance groups in solid state storage. The method 600 begins at a start operation and flow moves to operation 602.

At operation 602 data is received from non-volatile storage media. The data may comprise information identifying each of a plurality of dies included in non-volatile storage media and a number of blocks included in each of the plurality of dies. In examples, the data may comprise locational information for the plurality of dies.

From operation 602 flow continues to operation 604 where a determination is made as to a number of spare blocks that are included in each of the plurality of dies. The non-volatile storage media may have a capacity requirement (e.g., ½ TB, 1 TB). Each die may have a base number of blocks that is needed to meet the capacity requirement of the non-volatile storage media, and each block above that base number may be classified as a spare block.

From operation 604 flow continues to operation 606 where first and second sets of the plurality of dies are identified. The first set of dies may be identified as having a higher number of spare blocks than the second set of dies. In examples, identifying the first and second sets may include partitioning the dies based on their spare blocks. For example, a determination may be made as to a plurality of workloads that are going to utilize the non-volatile storage media (e.g., a first workload associated with a first application, a second workload associated with a second application), and an expected write-intensity of those respective workloads may be identified. Once the expected workloads are identified, the dies may be partitioned into sets based on the number of spare blocks in the dies. Dies with a higher number of spare blocks may be partitioned into sets that will be assigned to more write-intensive workloads and dies with a lower number of spare blocks may be partitioned into sets that will be assigned to less write-intensive workloads.

From operation 606 flow continues to operation 608 where a first workload is assigned to the first set of dies, the first workload classified as being write-intensive. In some examples, the classification may be relative to a read and/or write intensity of one or more additional workloads that will be handled by the non-volatile storage media. In other examples, the classification may be a stand-alone classification (e.g., not relative to other workloads). In some examples, the first workload may be associated with one or more applications executed on a host device associated with the non-volatile storage media. In additional examples, the first workload may be associated with a virtual machine executing the one or more applications executed on a host device associated with the non-volatile storage media.

From operation 608 flow continues to operation 610 where a second workload is assigned to the second set of dies, the second workload classified as being read-intensive. In some examples, the classification may be relative to a read and/or write intensity of one or more additional workloads that will be handled by the non-volatile storage media. In other examples, the classification may be a stand-alone classification (e.g., not relative to other workloads). In some examples, the second workload may be associated with one or more applications executed on a host device associated with the non-volatile storage media. In additional examples, the second workload may be associated with a virtual machine executing the one or more applications executed on a host device associated with the non-volatile storage media.

From operation 610 the method 600 moves to an end operation and the method 600 ends.

Figure 7:
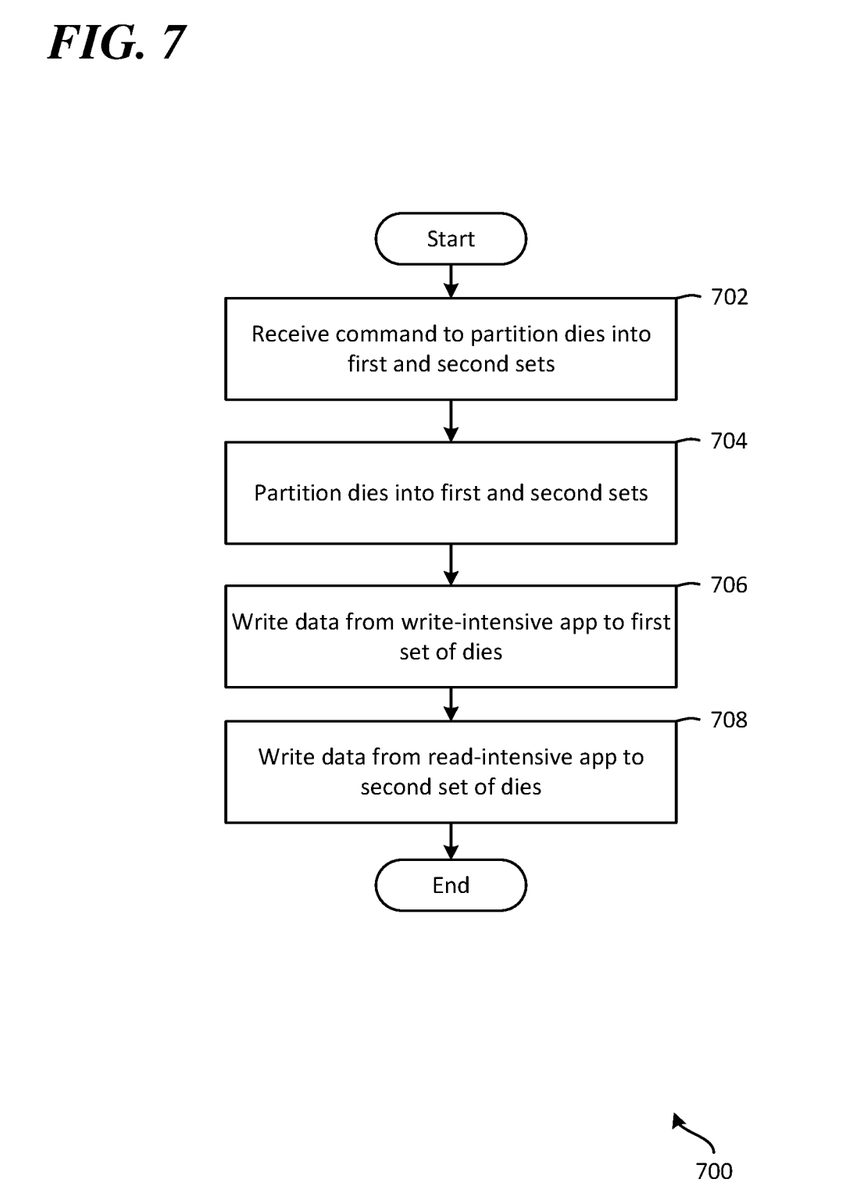
FIG. 7 is an exemplary method for writing data to different die sets in solid state storage based on application workload.

FIG. 7 is an exemplary method 700 for writing data to different die sets in solid state storage based on application workload. The method 700 begins at a start operation and flow moves to operation 702.

At operation 702 a command to partition a plurality of dies included in a storage system is received. The command may specify that the dies are to be partitioned into a first set of dies and a second set of dies, wherein the first set of dies has a higher number of spare blocks than the second set of dies. The number of spare blocks in a die may be determined based on a minimum number of blocks per die that is needed to meet capacity requirements of the storage system (e.g., ½ TB, 1 TB).

From operation 702 flow continues to operation 704 where the plurality of dies is partitioned into the first set of dies and the second set of dies. The partitioning may comprise a software partitioning, a firmware partitioning, a hardware partitioning, or a combination of the same. The partitioning may comprise assigning each set to a separate workload associated with the storage system. For example, a first workload may comprise execution of a first application that will be assigned to a first set of dies, and a second workload may comprise execution of a second application that will be assigned to a second set of dies.

From operation 704 flow continues to operation 706 where data from a first application executed on a first virtual machine of a host processing system is written to the first set of dies. The first application may be classified as a write-intensive application. In some examples, the write intensity may be relative to a second application executed on a second virtual machine of the host processing system. In other examples, the write intensity may be absolute (e.g., not relative to any other application).

From operation 706 flow continues to operation 708 where data from a second application executed on a second virtual machine of the host processing system is written to the second set of dies. The second application may be classified as a read-intensive application. In some examples, the read intensity may be relative to the first application. In other examples, the read intensity may be absolute (e.g., not relative to any other application). In this example, the first application is determined to require a higher number of writes over a period of time than the second application. Thus, the first application is more write-intensive than the second application.

From operation 708 flow moves to an end operation and the method 700 ends.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
    receiving data from non-volatile storage media, the data comprising:
        information identifying each of a plurality of dies included in the non-volatile storage media, and
        a number of blocks included in each of the plurality of dies;
    determining a number of spare blocks included in each of the plurality of dies;
    identifying a first set of the plurality of dies and a second set of the plurality of dies, wherein the first set of dies has a higher number of spare blocks than the second set of dies;
    assigning a first application or a first virtual machine with a first workload to the first set of dies, the first workload classified as being write-intensive; and
    assigning a second application or a second virtual machine with a second workload to the second set of dies, the second workload classified as being read-intensive.

2. The computer-implemented method of claim 1, wherein determining the number of spare blocks included in each of the plurality of dies comprises:
    determining a minimum number of blocks in each of the plurality of dies to meet a storage requirement for the non-volatile storage media; and
    identifying a number of blocks above the minimum number of blocks for each of the plurality of dies as the number of spare blocks included in each of the plurality of dies.

3. The computer-implemented method of claim 1, wherein:
    the first workload is determined based on receiving read-write specifications associated with a first virtual machine that will be assigned to the first set of dies; and
    the second workload is determined based on receiving read-write specifications associated with a second virtual machine that will be assigned to the second set of dies.

4. The computer-implemented method of claim 3, wherein the read-write specifications associated with the first virtual machine indicate that an application associated with the first virtual machine will require the non-volatile storage media to cache more than a threshold amount of data more than a threshold duration of times over a threshold duration of time.

5. The computer-implemented method of claim 3, wherein the read-write specifications associated with the second virtual machine indicate that an application associated with the first virtual machine will require the non-volatile storage media to cache more than a threshold amount of data less than a threshold duration of times over a threshold duration of time.

6. The computer-implemented method of claim 3, wherein:
    the read-write specifications associated with the first virtual machine are determined via application of a machine learning model that has been trained to identify read-write patterns to data associated with a first application that will be executed by the first virtual machine; and
    the read-write specifications associated with the second virtual machine are determined via application of the machine learning model to data associated with a second application that will be executed by the second virtual machine.

7. The computer-implemented method of claim 1, wherein each die in the first set of dies has a higher number of spare blocks than each die in the second set of dies.

8. The computer-implemented method of claim 7, wherein the dies included in the first set of dies are distributed across a plurality of channels and a plurality of rows in the plurality of channels.

9. The computer-implemented method of claim 1, wherein the dies included in the first set of dies are arranged in a first channel and the dies included in the second set of dies are arranged in a second channel.

10. The computer-implemented method of claim 1, wherein the dies included in the first set of dies are arranged in a first row in a plurality of channels and the dies included in the second set of dies are arranged in a second row in the plurality of channels.

11. The computer-implemented method of claim 1, further comprising:
executing a first garbage collection policy to the first set of dies, wherein the first garbage collection policy provides that garbage collection for the first set of dies will be initiated upon determining that less than a first threshold number of blocks in the first set of dies are free; and
executing a second garbage collection policy to the second set of dies, wherein the second garbage collection policy provides that garbage collection for the second set of dies will be initiated upon determining that less than a second threshold number of blocks in the second set of dies are free.

12. The computer-implemented method of claim 1, further comprising:
determining that there is no additional space in one of the first or second sets of dies to accept additional write operations; and
converting the set of dies with no additional space to a read-only set.

13. A storage device comprising:
non-volatile storage media;
a controller coupled with the non-volatile storage media and configured to:
receive data from the non-volatile storage media, the data comprising:
information identifying each of a plurality of dies included in the non-volatile storage media, and
a number of blocks included in each of the plurality of dies;
determine a number of spare blocks included in each of the plurality of dies;
identify a first set of the plurality dies and a second set of the plurality of dies, wherein the first set of dies has a higher number of spare blocks than the second set of dies;
assign a first application or a first virtual machine with a first workload to the first set of dies, the first workload classified as being write-intensive; and
assign a second application or a second virtual machine with a second workload to the second set of dies, the second workload classified as being read-intensive.

14. The storage device of claim 13, wherein:
the first workload is determined based on receiving read-write specifications associated with a first virtual machine that will be assigned to the first set of dies; and
the second workload is determined based on receiving read-write specifications associated with a second virtual machine that will be assigned to the second set of dies.

15. The storage device of claim 13, wherein each die in the first set of dies has a higher number of spare blocks than each die in the second set of dies.

16. The storage device of claim 15, wherein the dies included in the first set of dies are distributed across a plurality of channels and a plurality of rows in the plurality of channels.

17. The storage device of claim 13, wherein the controller is further configured to:
execute a first garbage collection policy to the first set of dies; and
execute a second garbage collection policy to the second set of dies.

18. The storage device of claim 17, wherein:
the first garbage collection policy provides that garbage collection for the first set of dies will be initiated upon determining that less than a first threshold number of blocks in the first set of dies are free; and
the second garbage collection policy provides that garbage collection for the second set of dies will be initiated upon determining that less than a second threshold number of blocks in the second set of dies are free.

19. A computing apparatus comprising:
a host processing system;
a storage system coupled to the host processing system and configured to:
receive a command to partition a plurality of dies included in the storage system into a first set of dies and a second set of dies, wherein the first set of dies has a higher number of spare blocks than the second set of dies;
partition the plurality of dies into the first set of dies and the second set of dies;
write data from a first application executed on a first virtual machine of the host processing system to the first set of dies, wherein the first application is classified as a write-intensive application; and
write data from a second application executed on a second virtual machine of the host processing system to the second set of dies, wherein the second application is classified as a read-intensive application.

20. The computing apparatus of claim 19, wherein the storage system is further configured to:
apply a first garbage collection policy to the first set of dies, the first garbage collection policy providing that garbage collection for the first set of dies will be initiated upon determining that less than a first threshold number of blocks in the first set of dies are free; and
apply a second garbage collection policy to the second set of dies, wherein the second garbage collection policy provides that garbage collection for the second set of dies will be initiated upon determining that less than a second threshold number of blocks in the second set of dies are free.

* * * * *